(12) United States Patent
Whatmough et al.

(10) Patent No.: US 10,797,915 B2
(45) Date of Patent: Oct. 6, 2020

(54) APPARATUS AND METHOD FOR PROCESSING A RECEIVED INPUT SIGNAL CONTAINING A SEQUENCE OF DATA BLOCKS

(71) Applicant: ARM LIMITED, Cambridge, Cambridgeshire (GB)

(72) Inventors: Paul Nicholas Whatmough, Cambridge, MA (US); Shidhartha Das, Upper Cambourne (GB)

(73) Assignee: ARM Limited, Cambridge (GB)

(*) Notice: Subject to any disclaimer, the term of this patent is extended or adjusted under 35 U.S.C. 154(b) by 0 days.

(21) Appl. No.: 15/761,212

(22) PCT Filed: Sep. 12, 2016

(86) PCT No.: PCT/GB2016/052814
§ 371 (c)(1),
(2) Date: Mar. 19, 2018

(87) PCT Pub. No.: WO2017/064454
PCT Pub. Date: Apr. 20, 2017

(65) Prior Publication Data
US 2018/0278445 A1    Sep. 27, 2018

(30) Foreign Application Priority Data
Oct. 12, 2015   (GB) .................................. 1518009.4

(51) Int. Cl.
*H04L 25/06* (2006.01)
*H04L 25/49* (2006.01)
(Continued)

(52) U.S. Cl.
CPC ...... *H04L 25/067* (2013.01); *H04L 25/03318* (2013.01); *H04L 25/069* (2013.01); *H04L 25/4902* (2013.01); *H04W 4/80* (2018.02)

(58) Field of Classification Search
CPC ................. H04L 25/067; H04L 25/069; H04L 25/03318; H04L 25/4902; H04W 4/80
See application file for complete search history.

(56) References Cited

U.S. PATENT DOCUMENTS

| | | | |
|---|---|---|---|
| 5,117,235 A * | 5/1992 | Ho-sun | H03M 1/42 341/136 |
| 6,137,844 A | 10/2000 | Maresca | |

(Continued)

FOREIGN PATENT DOCUMENTS

| | | |
|---|---|---|
| WO | WO 02/073914 | 9/2002 |
| WO | WO 03/010917 | 2/2003 |

OTHER PUBLICATIONS

Chen et al., "A 1mW 1Mb/s 7.75-to-8.25GHz Chirp-UWB Transreceiver with Low Peak-Power Transmission and Fast Synchronization Capability", ISSCC 2014 / Session 9 / Low-Power Wireless / 9.3., Feb. 11, 2014, 3 pages.

(Continued)

*Primary Examiner* — Sam K Ahn
*Assistant Examiner* — Amneet Singh
(74) *Attorney, Agent, or Firm* — Nixon & Vanderhye P.C.

(57) ABSTRACT

An apparatus and method are provided for processing a received input signal comprising a sequence of data blocks. Counter circuitry within the apparatus is arranged to receive a digital representation of the input signal, and for each data block generates a count value indicative of occurrences of a property of the digital representation (for example a rising edge or a falling edge) during an associated data block transmission period. Quantization circuitry then maps each count value to a soft decision value from amongst a predetermined set of soft decision values, where the number of soft decision values in the predetermined set exceeds a number of possible data values of the data block. The output circuitry then generates a digital output signal in dependence (Continued)

on the soft decision values. Such an apparatus has been found to provide a low power technique for a receiver, whilst still enabling the improved sensitivity benefits of using soft decisions to be achieved, and allows the apparatus to be constructed using all digital components.

11 Claims, 13 Drawing Sheets

(51) Int. Cl.
*H04L 25/03* (2006.01)
*H04W 4/80* (2018.01)

(56) References Cited

U.S. PATENT DOCUMENTS

| | | | |
|---|---|---|---|
| 6,792,055 B1* | 9/2004 | Hart | H03G 3/3036 |
| | | | 375/340 |
| 2002/0131530 A1 | 9/2002 | Zhang | |
| 2004/0177310 A1 | 9/2004 | Mohan et al. | |
| 2004/0201503 A1 | 10/2004 | Han et al. | |
| 2009/0153375 A1 | 6/2009 | Cedergren | |
| 2009/0196380 A1 | 8/2009 | Anekoji | |
| 2012/0140858 A1* | 6/2012 | Roh | H04L 27/205 |
| | | | 375/343 |
| 2013/0106637 A1 | 5/2013 | Liao et al. | |
| 2013/0120009 A1 | 5/2013 | Laplanche | |

OTHER PUBLICATIONS

Durante et al., "An ultra low power Wakeup Receiver for Wireless Sensor Nodes", IEEE Computer Society, Jun. 18-23, 2009, pp. 167-170.
Huy et al., "Low-Power 2.4 GHz Wake-Up Radio for Wireless Sensor Networks", IEEE Computer Society, Oct. 12-14, 2008, pp. 13-18.
Liu et al., "A MedRadio-Band Low-Energy-Per-Bit CMOS OOK Transreceiver for Implantable Medical Devices", IEEE, Nov. 10-12, 2011, pp. 153-156.
Milosiu et al., "A 3-μ 868-MHz Wake-Up Receiver with -83 dBm Sensitivity and Scalable Data Rate", IEEE, Sep. 16-20, 2013, pp. 387-390.
International Search Report for PCT/GB2016/052814 dated Nov. 24, 2016, 4 pages.
Written Opinion of the ISA for PCT/GB2016/052814 dated Nov. 24, 2016, 8 pages.
Combined Search and Examination Report for GB1518009.4 dated Jun. 8, 2016, 5 pages.

* cited by examiner

FSK MODULATION
TRANSMITTED SIGNAL

US 10,797,915 B2

APPARATUS AND METHOD FOR PROCESSING A RECEIVED INPUT SIGNAL CONTAINING A SEQUENCE OF DATA BLOCKS

This application is the U.S. national phase of International Application No. PCT/GB2016/052814 filed Sep. 12, 2016 which designated the U.S. and claims priority to GB Patent Application No. 1518009.4 filed Oct. 12, 2015, the entire contents of each of which are hereby incorporated by reference.

The present technique relates to an apparatus and method for processing a received input signal containing a sequence of data blocks.

There are many situations where there is a need for a low power receiver within communications systems. One example area where such low power receivers are useful is in the emerging technology of Internet of Things (IoT) devices. For example, body coupled communication (BCC) systems are emerging as a communications mechanism for such devices. Such devices do not typically require effective bulk data transfer so much as security, locationing and context information, and BCC systems can be suitable in such situations because communication is enabled only for devices in close proximity to the human body.

IoT devices are typically energy-constrained, and accordingly simple transmitters and receivers are required for communication between such IoT devices.

Receiver sensitivity is important in such devices because that ultimately determines performance in terms of communications range and noise immunity.

Accordingly, it would be desirable to provide an improved sensitivity receiver that could be used in such energy-constrained low power applications.

In one example configuration, there is provided an apparatus, comprising: counter circuitry to receive a digital representation of an input signal comprising a sequence of data blocks, and for each data block to generate a count value indicative of occurrences of a property of the digital representation during an associated data block transmission period; quantization circuitry to map each count value to a soft decision value from amongst a predetermined set of soft decision values, the number of soft decision values in said predetermined set exceeding a number of possible data values of the data block; and output circuitry to generate a digital output signal in dependence on the soft decision values.

In another example configuration, there is provided a method of operating an apparatus to process a received input signal comprising a sequence of data blocks, comprising: obtaining a digital representation of the input signal; for each data block, employing counter circuitry to generate a count value indicative of occurrences of a property of the digital representation during an associated data block transmission period; mapping each count value to a soft decision value from amongst a predetermined set of soft decision values, the number of soft decision values in said predetermined set exceeding a number of possible data values of the data block; and generating a digital output signal in dependence on the soft decision values.

In a yet further example configuration, there is provided an apparatus, comprising: counter means for receiving a digital representation of an input signal comprising a sequence of data blocks, and for generating, for each data block, a count value indicative of occurrences of a property of the digital representation during an associated data block transmission period; quantization means for mapping each count value to a soft decision value from amongst a predetermined set of soft decision values, the number of soft decision values in said predetermined set exceeding a number of possible data values of the data block; and output means for generating a digital output signal in dependence on the soft decision values.

The present technique will be described further, by way of example only, with reference to embodiments thereof as illustrated in the accompanying drawings, in which.

Figure 1:
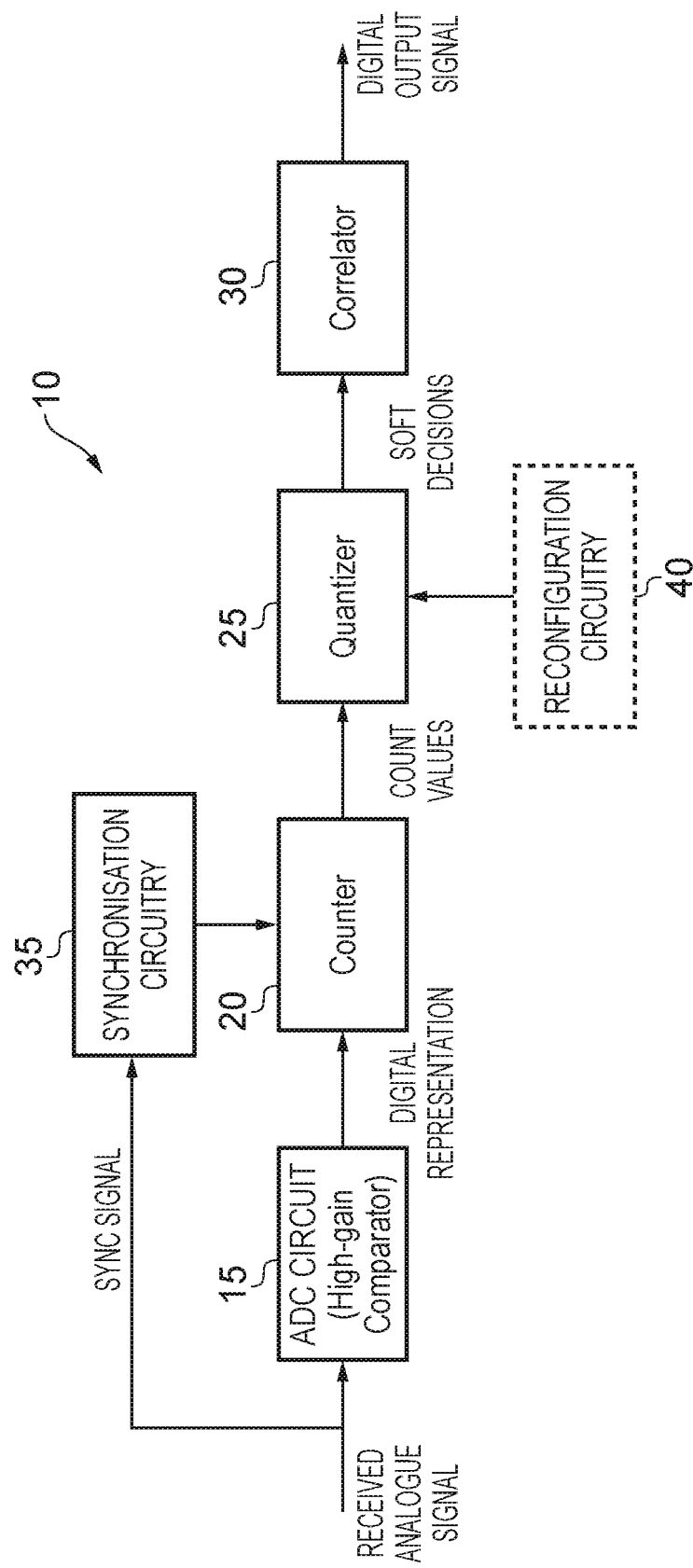
FIG. 1 is a block diagram of an apparatus in accordance with one embodiment.

Before discussing the embodiments with reference to the accompanying figures, the following description of embodiments is provided.

An approach to improving receiver sensitivity is to use so-called soft decisions in the receiver, instead of thresholding the incoming data bits into logic 0 or logic 1 values. The soft decisions instead give an N-bit number that represents the likelihood of a particular data value, such as a logic 0 or a logic 1 value, and hence essentially encodes more information. This extra information can then be exploited within the receiver.

In one embodiment, an apparatus is provided having counter circuitry that is arranged to receive a digital representation of an input signal comprising a sequence of data blocks. Each data block can take a variety of forms, and hence for example in one embodiment each data block may represent a single bit data value, whilst in an alternative embodiment each data block may represent a multi-bit data value. For each data block, the counter circuitry is arranged to generate a count value indicative of occurrences of a property of the digital representation during an associated data block transmission period. The apparatus then employs quantization circuitry to map each count value to a soft-decision value from amongst a predetermined set of soft-decision values. The number of soft-decision values in the predetermined set exceeds the number of possible data values of the data block, and hence the soft-decision values can be arranged to encode more information, and effectively provide information about the likelihood of the associated data block having a certain data value from amongst the possible data values of the data block. Output circuitry is then arranged to generate a digital output signal in dependence on the soft-decision values.

The apparatus of the above described embodiment is able to exhibit the improved receiver sensitivity associated with the use of soft-decisions, whilst consuming significantly reduced power when compared with known soft-decision receivers. In one embodiment, the apparatus can be constructed using digital components, avoiding the need for the complex and power hungry analogue components associated with known soft-decision receivers.

Furthermore, in some embodiments the required digital components can be constructed using digital standard cells from a standard cell library, hence providing a very efficient mechanism for designing the apparatus. Such an approach also allows for very rapid porting of technology between silicon processes, as well as providing other benefits such as automated layout for time-to-market improvements and rapid production testing using digital logic scan techniques.

In one embodiment, over the range of possible count values, the quantization circuitry is arranged to apply a non-linear mapping between count values in that range and corresponding soft-decision values. Such an approach enables the apparatus to effectively be tuned to compensate for factors that otherwise might introduce inaccuracies if the count values were to be used directly to determine the appropriate output signal to issue from the output circuitry of the apparatus.

For example, in one embodiment the non-linear mapping is arranged to take into account an effect of noise on the property of the digital representation whose occurrence is to be counted by the counter circuitry. There may be many sources of noise that can affect the property of the digital representation. For example, the input signal will typically have been transmitted from another apparatus, and interference in the transmission channel will be once source of noise that can affect the property of the digital representation. Other sources of noise could be device noise, where particular components processing the signal along its path from transmission through to analysis by the counter circuitry introduce noise that affects the property of the digital representation. As another example, power supply noise may also affect the property of the digital representation. In particular, all of these sources of noise can affect the accuracy of the number of occurrences of the property within the data block transmission period, by introducing spurious additional occurrences and/or spurious omissions. Yet another source of noise could be process variations between matched transistors in the receiver circuitry that can cause the received bits to be interpreted erroneously, thereby adding an additional source of noise.

By applying the non-linear mapping between the count values and the corresponding soft-decision values, such noise effects can be compensated for. For example, if we consider an embodiment where each data block has a single bit data value which is either a logic 0 value or a logic 1 value, then having regard to the way in which the transmitted signal is generated for transmission to the apparatus it may be expected that there will be a particular count value detected within the digital representation when the data block has a logic 0 value, and a different count value expected in relation to a data block that has a logic 1 value, in the absence of any noise effects. However, the actual count values observed when processing a sequence of data blocks may vary, due to the noise effects. Nevertheless, it may be the case that there are a particular subset of the count values that have a relatively high number of occurrences relative to other count values, which can then be assumed to be count values associated with the logic 0 and logic 1 values of the data block. A non-linear mapping can be developed such that those count values are mapped to soft decision values indicating high likelihoods of the logic 0 value and logic 1 value, respectively. By adopting this non-linear mapping, the effects of the noise on the property of the digital representation is effectively compensated for, providing a significant increase in the accuracy of the soft decision values relative to a purely linear approach based on theoretical expectations about count values.

Whilst the non-linear mapping may in one embodiment be fixed, in an alternative embodiment the apparatus may further comprise re-configuration circuitry to monitor the digital representation over multiple data blocks to determine from the resulting count values the likelihood of individual count values indicating particular data values of the data block, and to update the non-linear mapping dependent on said determination. Hence, by such an approach, the actual non-linear mapping employed can be adapted over time, for example to compensate for variations in the noise that may arise, and hence for the variation in the effects that such noise may have on the property of the digital representation, and in particular the number of occurrences of the property that arise within particular data blocks.

The re-configuration circuitry can be utilised in a number of situations. For example, it may be used in an initialisation mode where the updating of the mapping occurs on initialisation of the apparatus using at least one predetermined transmitted signal to form the input signal. Accordingly, in such an embodiment there would be an initialisation step where the mapping was produced based on observing the count values obtained when analysing reception of the predetermined transmitted signal(s).

In another embodiment, a periodic testing mode may be used where a periodic testing process is performed using at least one predetermined transmitted signal to form the input signal. Essentially, the process performed may be similar to that performed in the above initialisation mode, but repeated periodically during use of the apparatus by placing the apparatus into a testing mode.

As another alternative, a continuous monitoring mode may be provided where the updating of the mapping occurs based on the count values obtained from the digital representation of the input signal provided during active operation of the apparatus. In this continuous monitoring mode, test sequences are not used, but instead the actual live reception data is used and analysed to determine when to alter the non-linear mapping. For example, in some embodiments it may be expected that by monitoring the received traffic on an ongoing basis, a statistical analysis of the count values can be made, in order to identify the count values that occur most frequently. Those most frequently occurring count values can then be associated with particular possible data values of the data blocks, and a decision as to how to map those count values to particular soft decision values can accordingly be made. The other count values can then be matched to the other available soft decision values taking into account how the most frequently occurring count values have been mapped to the high likelihood soft decision values.

The output circuitry can take a variety of forms, but in one embodiment comprises correlator circuitry to determine a correlation between at least one predetermined data pattern and a sequence of the soft decision values received from the quantization circuitry, and to generate the digital output signal dependent on said determination. Hence, in such embodiments, the correlator circuitry can consider sequences of the soft decision values output by the quantization circuitry, and seek to correlate them against one or more predetermined data patterns that are expected to be received. Since the soft decision information effectively encodes likelihood information, the correlator may for example be arranged to take less account of soft decisions that are deemed to identify particular data values with a low likelihood, so that those soft decisions with low likelihood do not contribute as strongly towards the final correlation result. This provides a receiver with significantly improved sensitivity, allowing an increase in receiver performance, for example in terms of communications range and/or noise immunity.

In one embodiment, the apparatus further compromises conversion circuitry to receive the input signal as an analogue signal and to convert said analogue signal into said digital representation. Whilst the conversion circuitry can take a variety of forms, in one embodiment, it can be embodied by a relatively simple digital circuit. For example, in one embodiment the conversion circuitry comprises an amplifying comparator circuit. Whilst the amplifying comparator circuit may introduce a certain amount of noise into the input signal, for example due to variations in the comparator threshold that may lead to occasional spurious occurrences or omissions in the property of the digital representation, such noise can readily be accommodated by use of the non-linear mapping employed by the quantization circuitry, as discussed earlier. Hence, such an approach enables simple digital circuitry to be used to effectively convert the incoming analogue signal into the digital representation required by the counter circuitry, whilst not adversely affecting the accuracy of the receiver apparatus.

The amplifying comparator circuit can take a variety of forms, but in one embodiment comprises a series of inverter stages, at least one of the inverter stages incorporating a feedback path. In one particular embodiment, the amplifying comparator circuit comprises a high-gain digital inverter chain.

The property of the digital representation whose occurrences are monitored by the counter circuitry can take a variety of forms, but in one embodiment the property is a predetermined edge transition within the digital representation, for example a rising edge transition or a falling edge transition. Indeed, in some embodiments, the apparatus may be arranged to count both rising edge transitions and falling edge transitions.

The input signal can take a variety of forms, but in one embodiment is in a modulated format, such that the number of occurrences of said property of the digital representation within the data block transmission period vary in dependence on a data value of the data block and at least one noise factor. In particular, when the original signal is encoded for transmission, the modulation technique employed will ensure that the number of occurrences of the property that is ultimately to be monitored by the counter circuitry will vary dependant on the data value being transmitted. For example, many modulation schemes such as Amplitude-Shift Keying (ASK) modulation (of which On-Off Keying (OOK) is an example) or Frequency-Shift Keying (FSK) modulation may be used to produce transmitted signals where the number of rising edges (or falling edges) of the digital signal within each data block transmission period will vary dependent on the data value of the data block being transmitted during that period. As mentioned earlier, certain noise factors can introduce spurious occurrences or omissions of such edges, but the earlier mentioned non-linear mapping used by the quantizer when mapping count values to particular soft decision values can effectively compensate for such noise factors.

As mentioned earlier, each data block may encode a single-bit data value in one embodiment, but in another embodiment may encode a multi-bit data value.

In one embodiment, the apparatus further comprises synchronisation circuitry to synchronise a start of each data block transmission period with a portion of the digital representation corresponding to a data block in the received input signal. In particular, as the input signal is received, certain synchronisation information may be extracted from the received input signal in order to identify the start of each data block transmission period, with that synchronisation information being used to reset the counter as each new data block is encountered in the received signal. This ensures that an accurate count value is obtained for each data block transmission period.

Many different modulation schemes can be used for generating the transmission data that is received as an input signal by the above described apparatus. However, irrespective of the technique used, for at least some data blocks, the expected repetition rate of the property of the digital representation is higher than a frequency of repetition of the data block transmission period. Hence, for at least some of the possible data values for the data block, it is expected that multiple occurrences of the property of the digital representation will occur during the associated data block transmission period.

Particular embodiments will now be described with reference to the Figures.

FIG. 1 is a block diagram of a receiver apparatus in accordance with one embodiment. A received analogue signal is passed through an analogue to digital converter circuit 15, which in one embodiment takes the form a high gain comparator that will be discussed in more detail later. This results in the output of a digital representation of the received analogue signal to counter circuitry 20.

The received analogue signal will consist of a sequence of data blocks, where each data block provides a data value, which may be a single-bit value or a multi-bit value. Such data blocks may also be referred to herein as symbols. Accordingly, the digital representation can also be considered to consist of a sequence of data blocks. Due to the way in which the original transmitted data was modulated for transmission to the receiver apparatus 10, the form of the signal during each data block transmission period will be such that a property of that signal will change dependent on the data value being encoded in that data block. For example, in one embodiment the number of oscillations of the signal during a data block transmission period will vary in dependence on the data value being encoded in that data block transmission period.

Hence within the digital representation produced by the ADC (analog-to-digital converter) circuit 15, within each data block transmission period a corresponding property in the digital representation will also have a number of occurrences that varies in dependence on the data value encoded by that data block. For example, in one embodiment the number of rising edges (and indeed falling edges) of the digital signal within each data block transmission period of the digital representation will vary dependent on the original data value encoded in the corresponding transmitted data block.

Accordingly, the counter circuitry 20 can be used during each data block transmission period to count the number of occurrences of such a property of the digital representation, for example by counting the number of rising edges appearing in that data block transmission period. In one embodiment, the counter is reset at the beginning of each data block transmission period, and accordingly the cumulative count value at the end of the data block transmission period identifies the number of occurrences of the measured property of the digital representation within that data block transmission period. In one embodiment as shown in FIG. 1, synchronisation circuitry 35 can be used to synchronise the operation of the counter 20 to ensure that the counter is reset at the beginning of each data block transmission period. In one embodiment, the synchronisation circuitry is responsive to a synchronisation signal provided within the received analogue signal (for example transmitted periodically from the transmitter) to determine the timing of the data block transmission period, and control the counter accordingly. Each time the synchronisation signal is received, this can cause the synchronisation circuitry to perform a synchronisation adjustment process to ensure that the timing of the operation of the counter is always aligned with the data block transmission period.

Whilst the count values produced by the counter may in themselves provide a reasonable indication of the data value encoded within each data block transmission period, based on knowledge of the modulation being used at the transmitter, noise effects can affect the count values obtained in any particular data block transmission period. The noise can occur from a variety of sources, including interference in the transmission channel, device noise and power supply noise. These various sources of noise can cause spurious additions and spurious omissions in a number of occurrences of the property of the digital representation being counted, for example the number of rising edges in the earlier mentioned specific example.

As shown in FIG. 1, a quantizer circuit 25 is used to convert the incoming count values from the counter circuitry into soft decision values that are then forwarded to a correlator circuit 30. The number of possible soft decision values exceeds the number of possible data values, and hence the soft decision values essentially provide additional information, in particular likelihood information about the data value represented by any particular data block, thus providing the correlator with more information than would be the case had the quantizer sought to directly determine the data values of each data block from the count values provided by the counter.

Furthermore, in accordance with one embodiment, the quantizer is configured to apply a non-linear mapping between the count values and associated soft decision values, with the non-linear mapping being chosen so as to seek to compensate for the earlier mentioned noise effects. This will be discussed in more detail later, but in essence, based on an understanding of how noise may affect the count values, the quantizer can compensate for those effects when mapping a count value to a soft decision value. Taking a specific example where each data block encodes a single-bit value which may hence be a 0 or a 1, if On-Off Keying (OOK) is used as the modulation technique for the transmitted signal, it may be expected that during a data block transmission period for a data block encoding a logic 0 value, no rising edges should be seen, whilst for a data block transmission period representing a logic one value, a predetermined multiple number of transitions (say for example "X" transitions) would be expected, these being the theoretical numbers assuming no noise. However, noise effects may mean that in fact a relatively small non-zero count value is actually the count value most likely to be indicative of a logic 0 value encoded into the data block, and similarly a count value Y somewhat different to the count value X may actually be the count value most likely to represent a logic 1 value. This information can be incorporated into the mapping employed by the quantizer when deciding what soft decisions to issue for any particular received count value.

As also shown in FIG. 1, whilst the non-linear mapping employed by the quantizer 25 may be fixed, in an alternative embodiment it may be reconfigurable, and in particular reconfiguration circuitry 40 may be arranged, upon certain trigger conditions, to perform an evaluation process based on a number of received count values in order to determine whether the non-linear mapping should be altered. The reconfiguration circuitry 40 may in one embodiment be triggered on initialisation of the apparatus 10 to evaluate the count values obtained for some predetermined test transmission signal, and to then determine the appropriate non-linear mapping based on the outcome of that evaluation. Alternatively, the reconfiguration circuitry may be used periodically in a testing mode to re-evaluate count values for one or more predetermined test signals, and to update the non-linear mapping used by the quantizer based on that evaluation. In a yet further alternative embodiment, the reconfiguration circuitry 40 could be used in a continuous monitoring mode where the updating of the mapping occurs based on the count values obtained in response to real data traffic received during normal operation of the device. Whilst in such an embodiment the reconfiguration circuitry 40 will not have direct knowledge of the signal being transmitted, it can perform some statistical analysis on the count values obtained, and in particular can observe the frequency with which particular count values are received. Considering the earlier example of a single-bit data value in each data block, then those count values that occur most frequently can be assumed to be the count values providing the most likelihood of a logic 0 or a logic 1 value, and can be used to reconfigure the mapping accordingly.

The correlator 30 will typically be arranged to look for specific bit patterns in the received signal. As mentioned earlier, the correlator actually receives sequences of soft decisions, which effectively provide more information than if the incoming symbols had been thresholded into 0 or 1 data bits. In particular, when considering a sequence of soft decisions, the correlator can give more weight to those soft decisions that indicate a high likelihood of a particular data value and less weight to those symbols that indicate less likelihood of a particular data value, and hence provide an improved sensitivity receiver when seeking to match such sequences with particular predetermined bit patterns. The correlator then produces a digital output signal dependant on the results of such a correlation process. The digital output signal can take a variety of forms. However, purely by way of example, the receiver 10 may be seeking to monitor the received analogue signal for the occurrence of a particular predetermined bit pattern which identifies that the device including the apparatus 10 should perform a wake-up process. Accordingly, when the correlator matches a sequence of soft decisions with such a specific bit pattern, it can issue as a digital output signal a wake-up signal to other components within the device containing the receiver apparatus 10.

It will be appreciated that there are a number of known techniques for performing correlation, and any of these techniques can be used within the correlator 30. In one embodiment, the correlator performs an XOR function based on the incoming sequence of soft decisions and the predetermined bit pattern seeking to be detected. Purely for the sake of illustration, consider an embodiment where the mapping used was 11 means 1 (definite), 10 means 1 (maybe), 01 means 0 (maybe) and 00 means 0 (definite). In this case, a sequence 1011 forming an intended message will be encoded as 11 00 11 11, but may be received as 11 00 01 10. The correlator may be arranged to compare against multiple different patterns for the possible received message, i.e. 11 00 11 11 or 10 01 10 10 or 11 00 10 10 and so on. Given the received message is 11 00 01 10, then the correlator will indicate a failed message and not wake up the rest of the system. However, if the received message is 11 00 10 10, then the correlator will consider it a successful match, and wake up the rest of the system.

There are a number of different techniques that may be used to modulate the signal transmitted to the apparatus 10 of FIG. 1. However, in low power communication systems, simple modulation schemes are typically employed, such as Binary Amplitude-Shift Keying (BASK) and Binary Frequency-Shift Keying (BFSK). Use of such simple modulation allows for relatively simple transmitters and receivers.

Figure 2A:
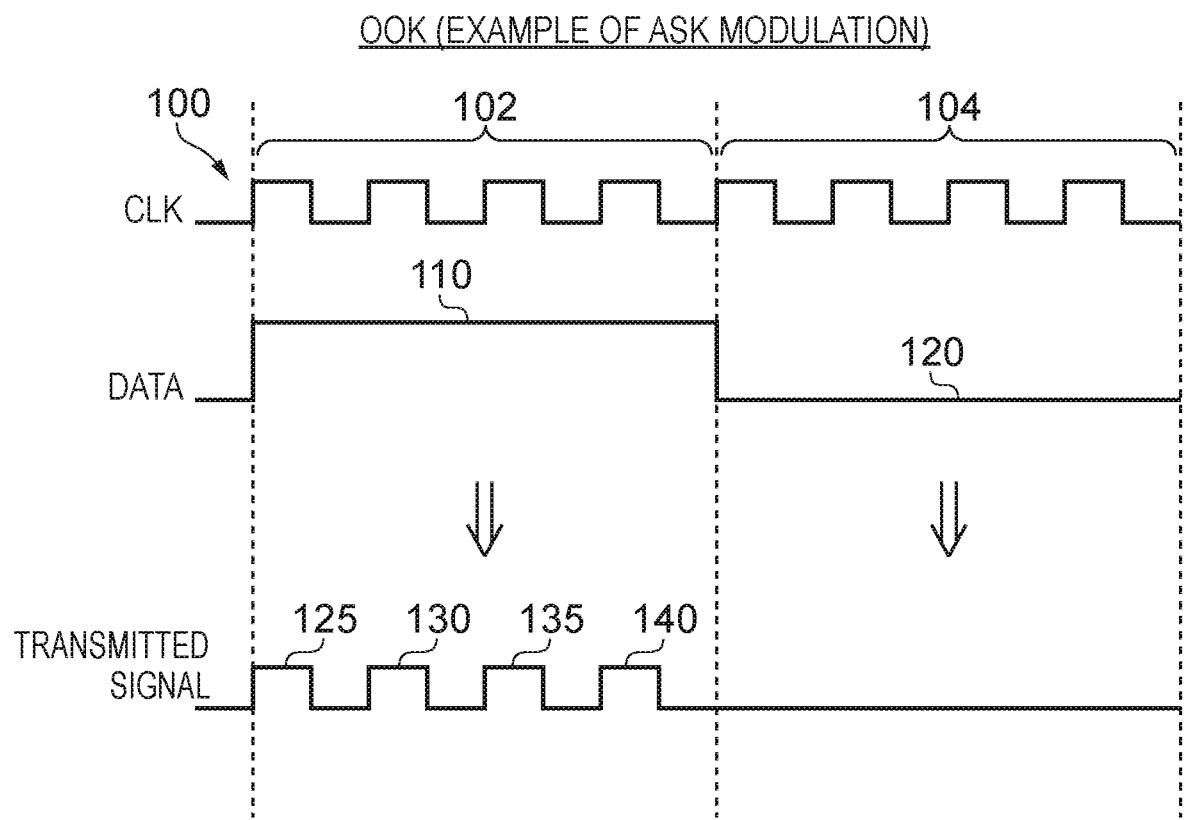
FIGS. 2A and 2B illustrate and on off keying (OOK) approach that may be used to generate the signal transmitted to the apparatus of FIG. 1 in accordance with one embodiment.

FIG. 2A illustrates an OOK technique, which is an example of ASK modulation. The transmitter uses the clock signal 100 to modulate the required data signal. Accordingly, when transmitting a logic 1 value 110 during a first data block transmission period 102, the transmitted signal may take the form of the oscillating signal shown in FIG. 2A, consisting of the series of peaks 125, 130, 135, 140. However, during a data block transmission period 104 where a logical 0 value 120 is to be transmitted, no oscillation signal is produced. Such a transmitted signal can be generated by an AND gate circuit 150 shown in FIG. 2B, with the transmitted signal being output over path 155.

Figure 2B:
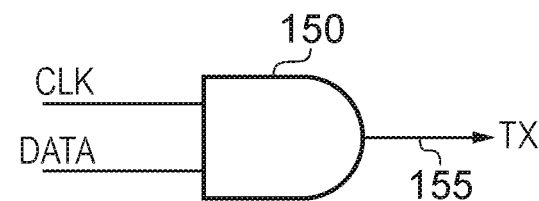

Whilst the signal referred to as the transmitted signal in FIG. 2B may indeed be transmitted directly in that form over the communications link, in an alternative embodiment, that signal may itself be used to modulate a higher frequency carrier which is then transmitted over the communications link, with the indicated transmitted signal then being reconstructed at the receiver end, using suitable circuitry such as an envelope detector.

Figure 3A:
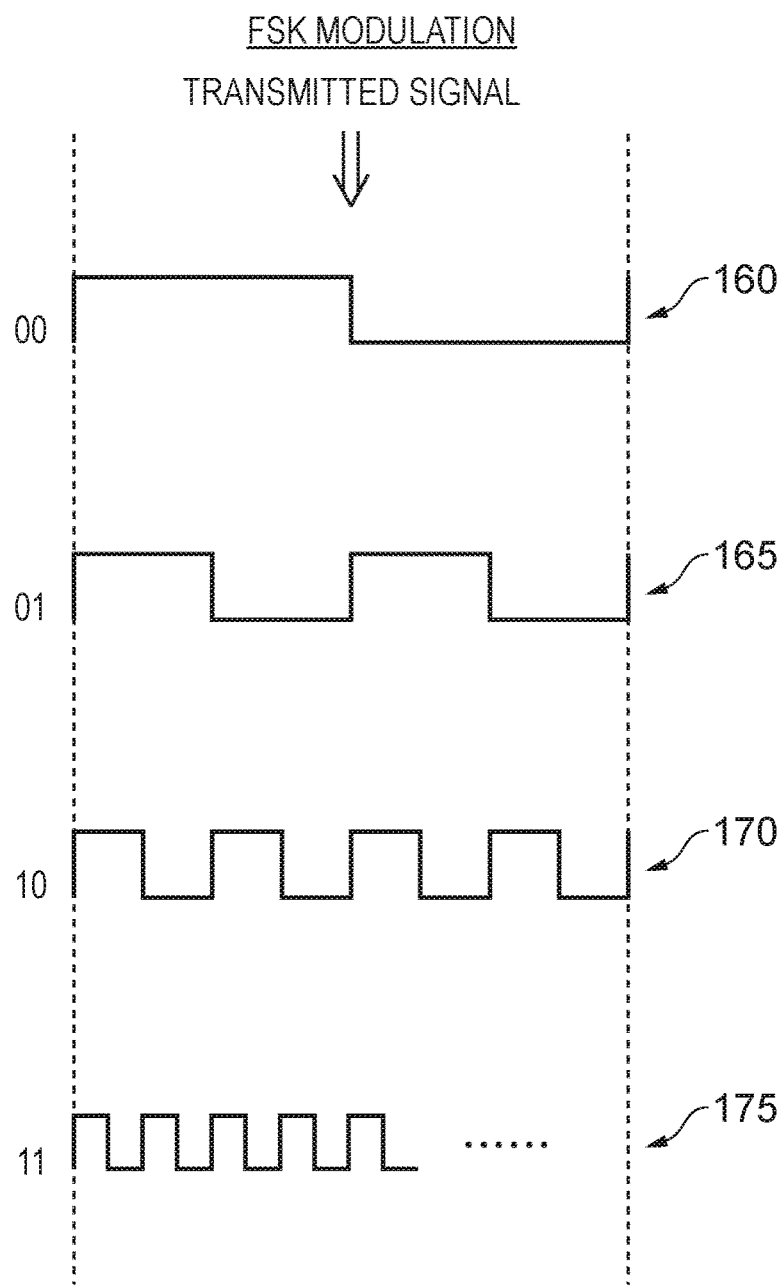
FIGS. 3A and 3B illustrate a frequency-shift keying (FSK) modulation approach that may be used to generate the signal transmitted to the apparatus of FIG. 1 in accordance with an alternative embodiment.
Figure 3B:
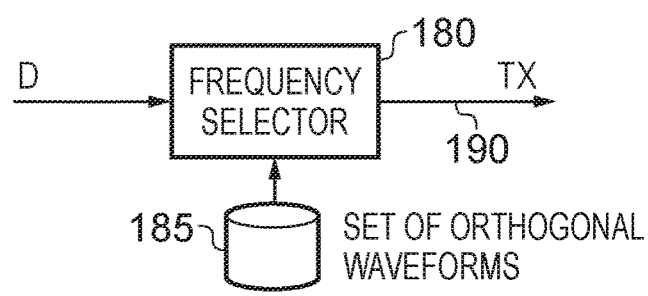

FIG. 3A schematically illustrates an FSK modulation technique. In this example, it is assumed that each data block transmits a 2-bit data value, and the frequency of the oscillating signal transmitted during each data block transmission period will vary dependent on the data value being encoded. In this particular example, given the four possible data values for the data block, there will be four possible oscillating signals 160, 165, 170, 175 that may be transmitted. FIG. 3B illustrates suitable circuitry that can be used to produce such a transmitted signal over path 190, the frequency selector 180 receiving the input data value, and accessing the storage 185 containing a set of orthogonal waveforms, in order to chose the waveform appropriate for the provided input data value. That waveform is then output over the path 190.

Figure 4:
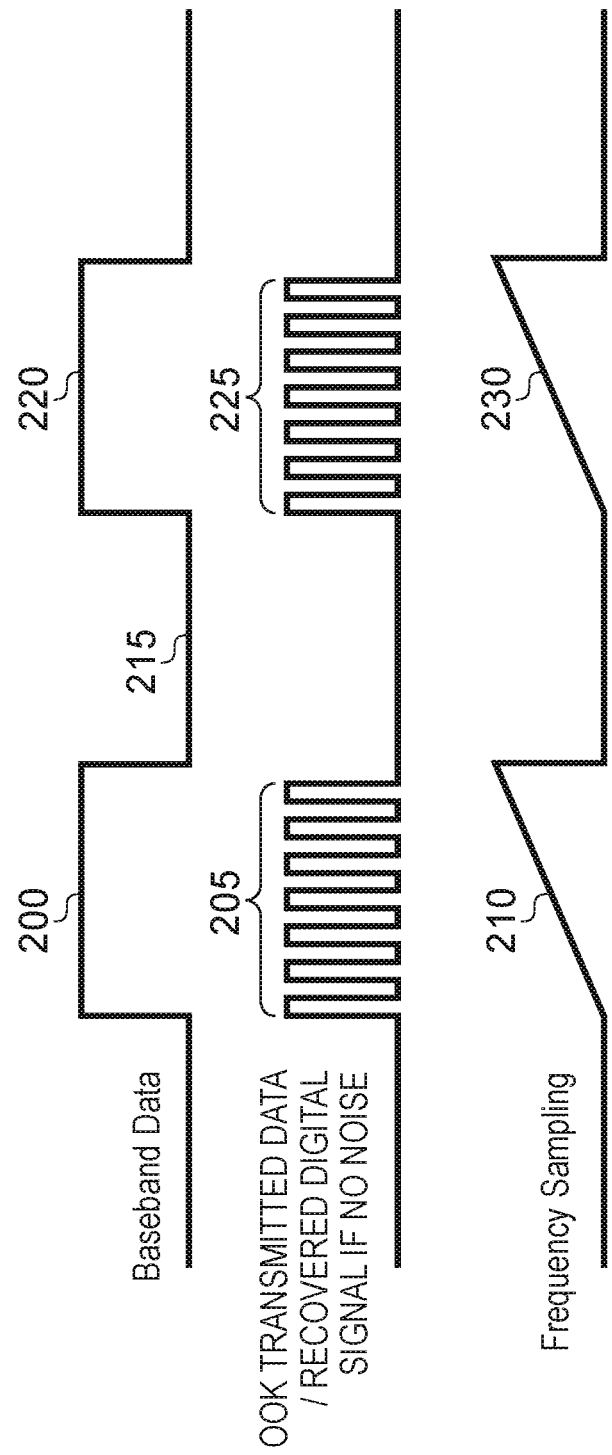
FIG. 4 illustrates the operation of the counter circuitry of FIG. 1 in accordance with 1 embodiment.

FIG. 4 is a diagram schematically illustrating the operation of the counter. The baseband data essentially corresponds to the data that is seeking to be transmitted, and accordingly in this example consists of a logic 1 value 200, followed by a logic 0 value 215, followed by another logic 1 value 220. In this example, it is assumed that OOK is used to modulate the transmitted data, resulting in the transmitted signal taking the form shown in the middle signal line of FIG. 4. Accordingly, during each transmission of a logic 1 value, the series of oscillations 205, 225 are produced. This signal also essentially corresponds to the digital representation produced by the ADC circuit 15 from the received signal, assuming that no noise effects are introduced. The counter is, as mentioned earlier, reset at the beginning of each data block transmission period, and accordingly count values of 0 are produced during the periods where a logic 0 value is being transmitted, but during the transmission of a logic 1 value, the count value steadily increases as shown by the ramp sections 210, 230 in the lower waveform shown in FIG. 4. The counter circuitry 20 hence acts as a digital frequency counter, counting for example the number of rising edges in the digital representation output from the ADC circuit 15. The obtained count values for each data block transmission period are then forwarded to the quantizer circuit 25.

Figure 5:
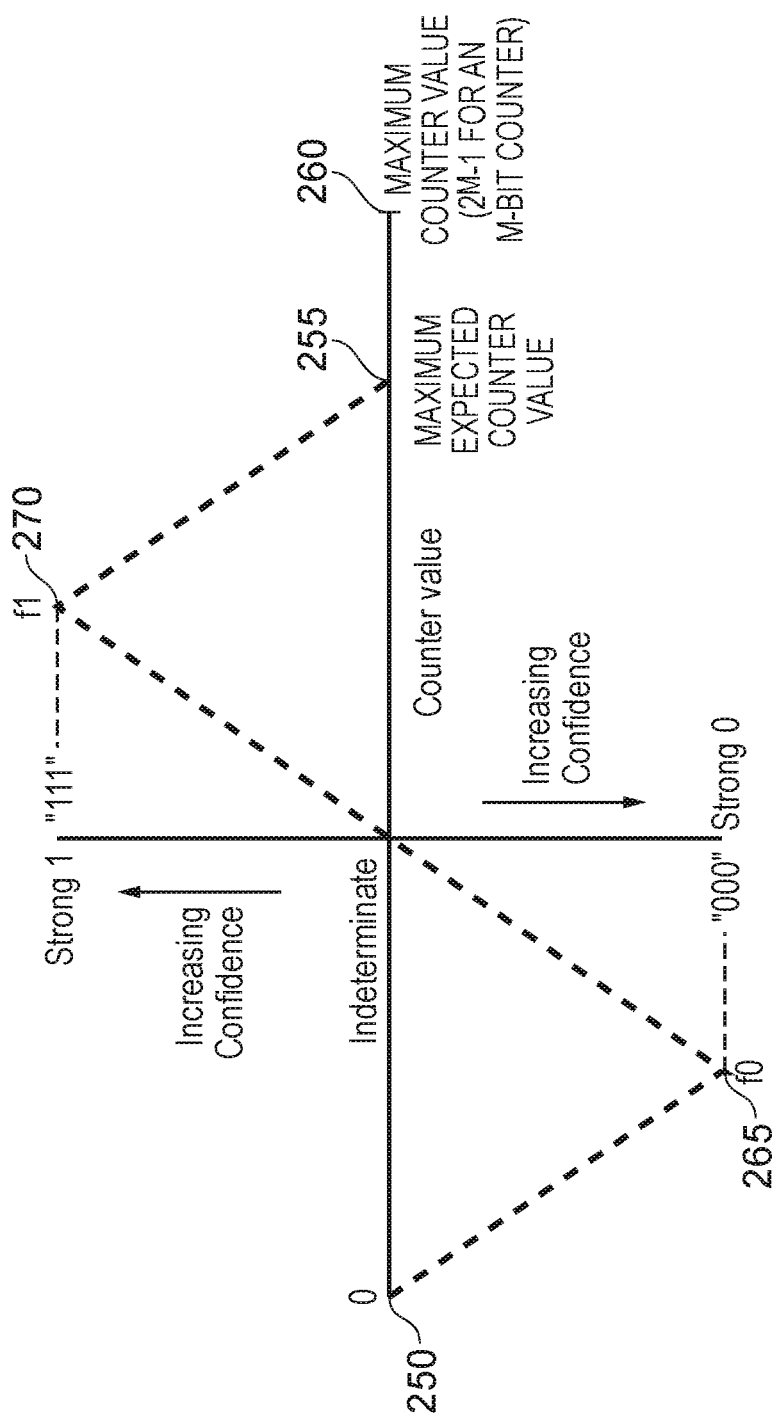
FIG. 5 is a graph schematically illustrating how the quantizer is arranged to map count values to soft-decision values in accordance with one embodiment.

However, as mentioned earlier, noise effects will influence the count values produced by the counter circuitry during each data block transmission period. FIG. 5 is a graph schematically illustrating how the quantizer 25 may adopt a non-linear mapping to map the count values to particular soft decision values to seek to account for such noise effects. The soft decision values can take a variety of forms, but in one embodiment it will be assumed that 3-bit soft decision values are provided, ranging from the value "000", through to the value "111". In one embodiment, the value "000" is used to indicate a strong likelihood of the data value of the data block being 0, and the value "111" is used to indicate a strong likelihood of the data value of the associated data block being a 1. Accordingly, a value of "001" may still indicate a relatively strong likelihood of a logic 0 value, and similarly a value "110" may still represent a reasonably strong likelihood of a logic 1 value. The remaining values in between are used to represent decreasing likelihoods.

In the ideal, no noise, case such as shown in FIG. 4, it will be appreciated that a count value of 0 should in fact represent the strongest likelihood of the transmitted data being a logic 0 value, and accordingly it might be assumed that a count value of 0 should be mapped to the soft decision value "000". Similarly, the maximum expected count value during a data block transmission period should in theory correspond with the strongest likelihood of the data value being a logic 1 value, and accordingly it might be expected that the maximum expected count value 255 should be mapped to the soft decision value "111". A straight line could then be provided between those two points to map all of the other counter values to suitable soft decision values.

However, as mentioned earlier noise introduced from a variety of sources can cause spurious additions and omissions in the number of edges observed within a particular data block transmission period, and accordingly it may in fact be the case that a certain non-zero count value actually indicates the strongest likelihood of a logic 0 value being transmitted, and also that the count value associated with the strongest likelihood of transmission of the logic 1 value may in fact be less than the expected theoretical maximum. This is shown schematically in FIG. 5 by the non-linear function that extends from point 250, through point 265 to point 270 and then on to point 255. In this example, the count value f0 at point 265 is actually the count value that is considered to most strongly indicate a logic 0 value in the data block, and similarly the count value f1 at the point 270 is the count value that is considered to give the most likelihood of indicating a logic 1 value in the data block. The dotted line extending through the points 250, 265, 270 and 255 is then used to map any other count value to an associated soft decision value.

As also shown in FIG. 5, in one embodiment the maximum possible counter value 260, (which is $2^M-1$ for an M-bit counter) is chosen to be higher than the expected maximum counter value 255 that will be observed by the counter during a data block transmission period, to avoid the possibility of the counter saturating during the data block transmission period.

Accordingly, it will be seen that, when considering the entire range of possible count values, the use of a non-linear mapping enables the generation of soft decisions by the quantizer to take into account the effects of noise, irrespective of the source of that noise, and hence for example irrespective of whether the noise is due to interference in the transmission channel, or device noise or power supply noise.

It will be appreciated that once the appropriate form of the non-linear mapping has been selected, a suitable quantizer circuit can be readily produced using digital components, in order to map any particular counter value to an associated soft decision value in accordance with the non-linear mapping. Hence, it will be seen that both the counter circuit 20 and the quantizer circuit 25 can be readily implemented using simple digital components, allowing for a very low cost and low power consumption technique for creating soft decisions from a digital representation of the received analogue signal.

Figure 6A:
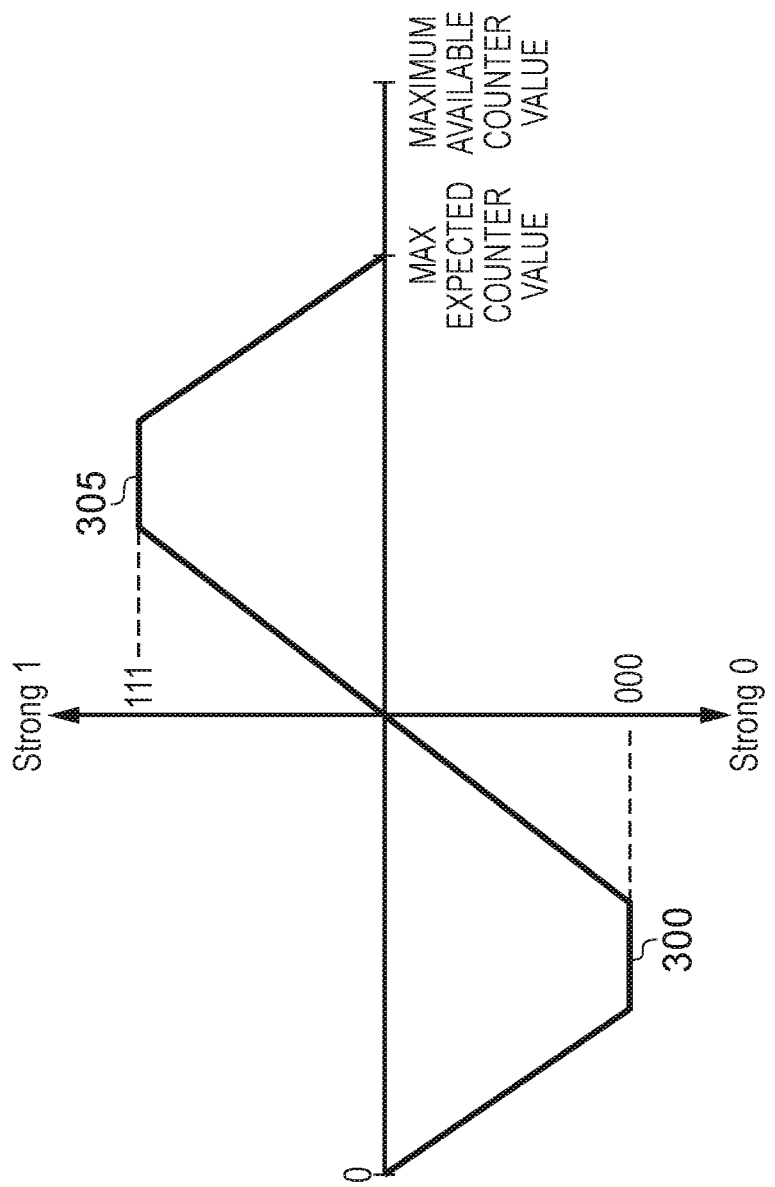
FIGS. 6A and 6B are graphs illustrating some variations in how the quantizer may map the count values to soft-decision values in accordance with alternative embodiments.
Figure 6B:
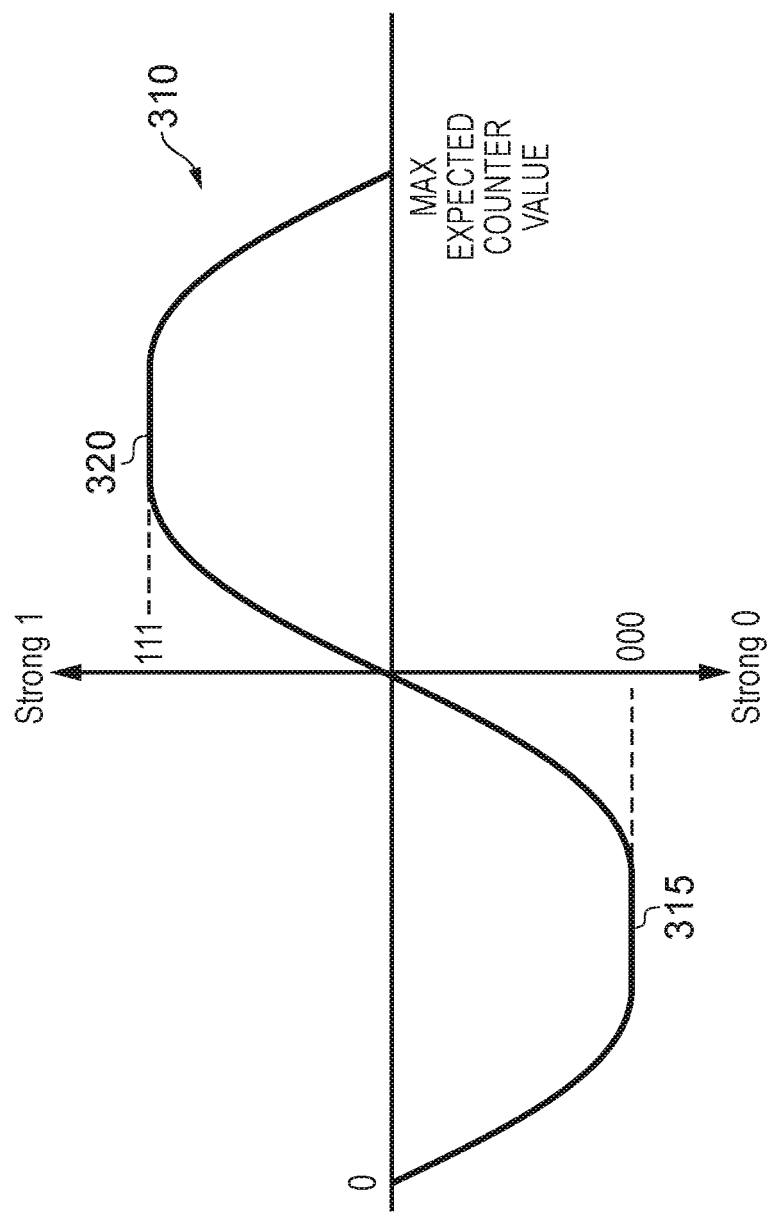

FIG. 5 illustrates one example non-linear mapping that may be used. In practice, it may often be the case that there will not be any one single count value that indicates the strongest likelihood of a logic 1 value, and similarly there will not necessarily be one single count value that indicates the strongest likelihood of a logic 0 value. Instead, as shown schematically in FIG. 6A, there may be a range of count values 300 that will all be mapped to the strongest likelihood of a logic 0 value, and hence get encoded as a soft decision "000". Similarly, there may be a range of count values 305 that all indicate the strongest likelihood of a logic 1 value, and accordingly get mapped to the soft decision value "111". Further, there is no requirement for the non-linear mapping to adopt straight line transitions between the various points 250, 265, 270, 255 shown in FIG. 5. For example, FIG. 6B shows another alternative form of non-linear mapping 310 where curved lines join up the various sections of the non-linear mapping. Again, there may be flat portions 315, 320 identifying multiple possible count values that map to the strongest likelihood of a logic 0 value or a logic 1 value.

Figure 7A:
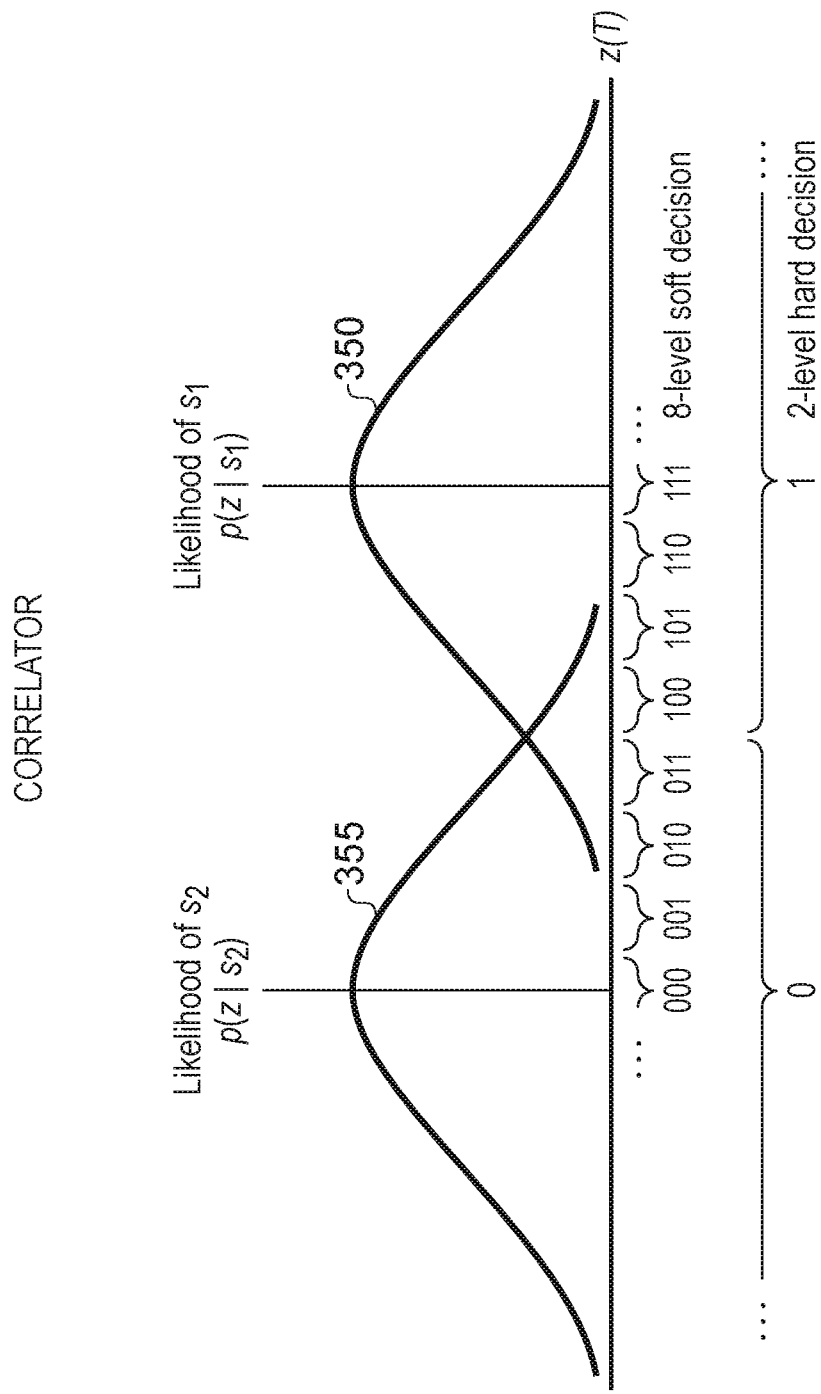
FIGS. 7A and 7B illustrate how the correlator of FIG. 1 may be arranged to interpret the soft-decision values in accordance with some embodiments.

The correlator 30 can be constructed in a standard manner. In one embodiment where the apparatus 10 is being used as a low power consumption receiver, the receiver apparatus 10 may be used to monitor for particular sequences of bit patterns, and possibly even a single bit pattern sequence, from the transmitter, and on detection of such bit patterns to then issue as a digital output signal one or more control signals to other components within the device containing the receiver apparatus 10. Since as mentioned earlier the soft decisions essentially encode additional information indicative of the likelihood of a particular data block containing a particular data value, the use of the soft decisions as an input to the correlator can significantly improve the receiver sensitivity. FIG. 7A is a graph used to illustrate how the correlator may interpret various soft decision values, such that soft decisions of low likelihood (i.e. those corrupted by noise) do not contribute as strongly towards the final correlation result. The curve 350 represents the likelihood of a symbol S1 from a symbol set containing the symbols S1 and S2. Similarly, the curve 355 illustrates the likelihood of the symbol S2. In one embodiment, the symbol S1 may represent a logic 1 value and the symbol S2 may represent a logic 0 value, and accordingly it can be seen that the soft decision value "000" is used to encode the most likelihood of a logic 0 value, and the soft decision value "111" is used to encode the most likelihood of a logic 1 value. Within the correlator, the correlator may give less weight to soft decision values of "011" or "100" than it does to other soft decision values, hence improving sensitivity when seeking to determine whether the received sequence of bits match one or more predetermined bit patterns that the correlator is seeking to observe.

Figure 7B:
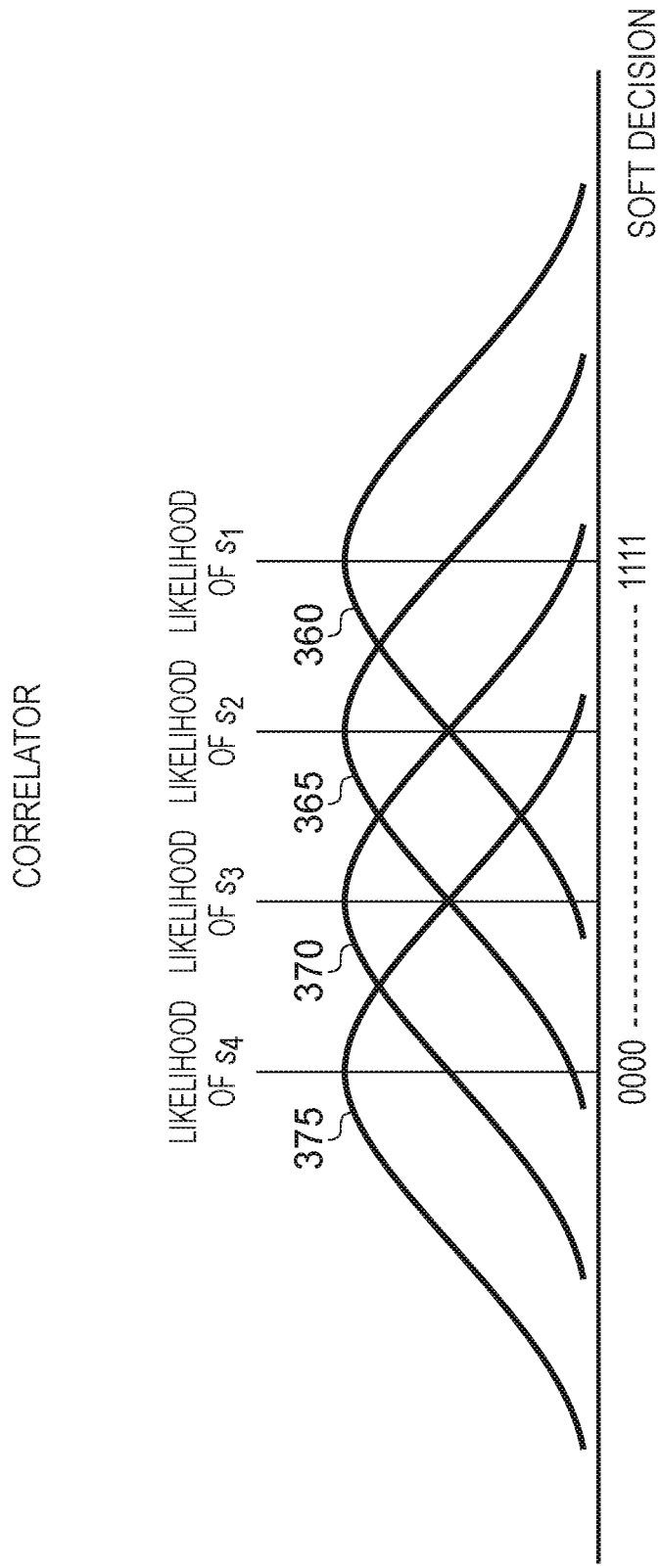

FIG. 7B illustrates a corresponding sequence of curves 360, 365, 370, 375 for a symbol set consisting of four possible symbol states. These symbol states may for example correspond to the four 2-bit data values discussed earlier with reference to FIG. 3A. In such an embodiment, it may be appropriate to use a four-bit soft decision value, in order to allow sufficient variation in the various soft decisions. Again, the correlator can use this information in order to give weight to soft decisions identifying a strong likelihood of a particular data value, and to de-emphasise soft decisions indicating a low likelihood of one or more data values.

The correlator can be formed of digital components, and consume low power, hence enabling the overall apparatus 10 to be formed from digital components and have a low power consumption.

As mentioned earlier, the ADC circuit 15 can in one embodiment be formed by a high gain comparator. One example of such a high gain comparator is show in FIG. 8A. As shown, such a high gain comparator can be constructed simply using digital components, and in one embodiment takes the form of a high gain digital inverter chain formed of the inverters 405, 410, 415. The received analogue signal is illustrated by the waveform 430 in FIG. 8A, and the capacitor 400 serves to strip off the DC component of that signal, resulting in the signal 440. The first inverting amplifier 405 has a feedback path provided, which may optionally incorporate a resistive element 420. The resistive element 420 can be used to vary the biasing point of the inverting amplifier. The operation of the component 405 can be illustrated with reference to the graph of FIG. 8B. The graph shows how the voltage at the input of the invertor 405 varies with the output voltage of the inverter. Hence, when the input voltage is at a logic 1 voltage level, the output voltage is at a logic 0 voltage level, and when the input voltage level is at a logic 0 voltage level, the output voltage level is at a logic 1 voltage level. The mapping between the input and output voltage levels is shown by the curve 500. The dotted line 505 aims to illustrate the effect of the feedback path, which tends to cause the input and output voltage to settle at the point 515. The use of the resistive element 420 can be used to move that biasing point 515 up or down the curve as desired.

When the small oscillating signal 440 is then provided as an input to the component 405 with its feedback path, it can be seen that small oscillations in the input will cause relatively large oscillations in the output, due to the steepness of the curve section 510. Accordingly, the input signal 440 is converted into the amplified and inverted intermediate signal 450. This signal is then passed through the two inverters 410, 415 which act as an amplifier to convert the intermediate signal 450 into the output digital signal 460. The signal 460 then forms the digital representation that is provided to the counter, allowing the counter to count rising or falling edges in that digital representation during each data block transmission period.

Figure 8A:
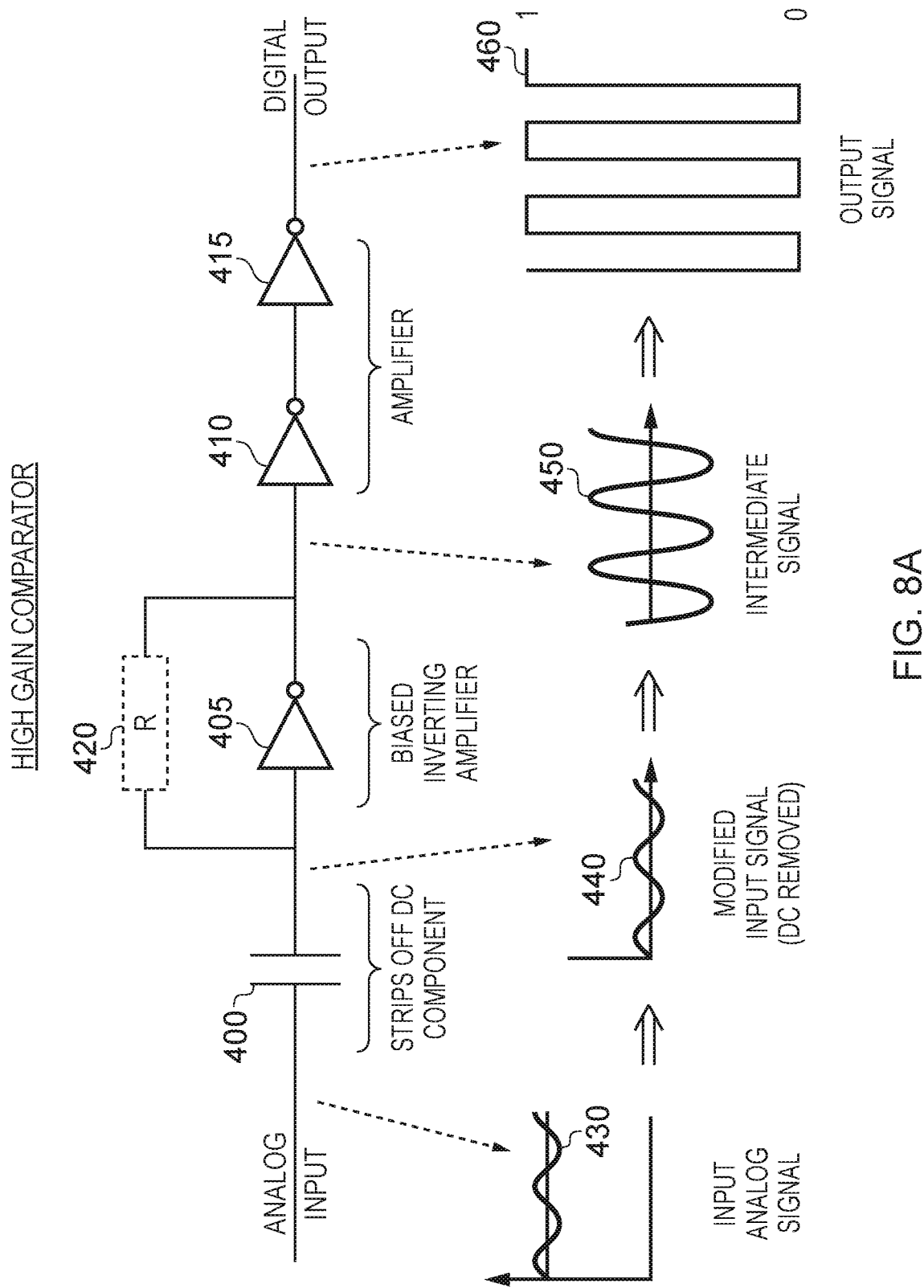
FIGS. 8A and 8B illustrate the operation of the high-gain comparator of FIG. 1 in accordance with one embodiment.
Figure 8B:
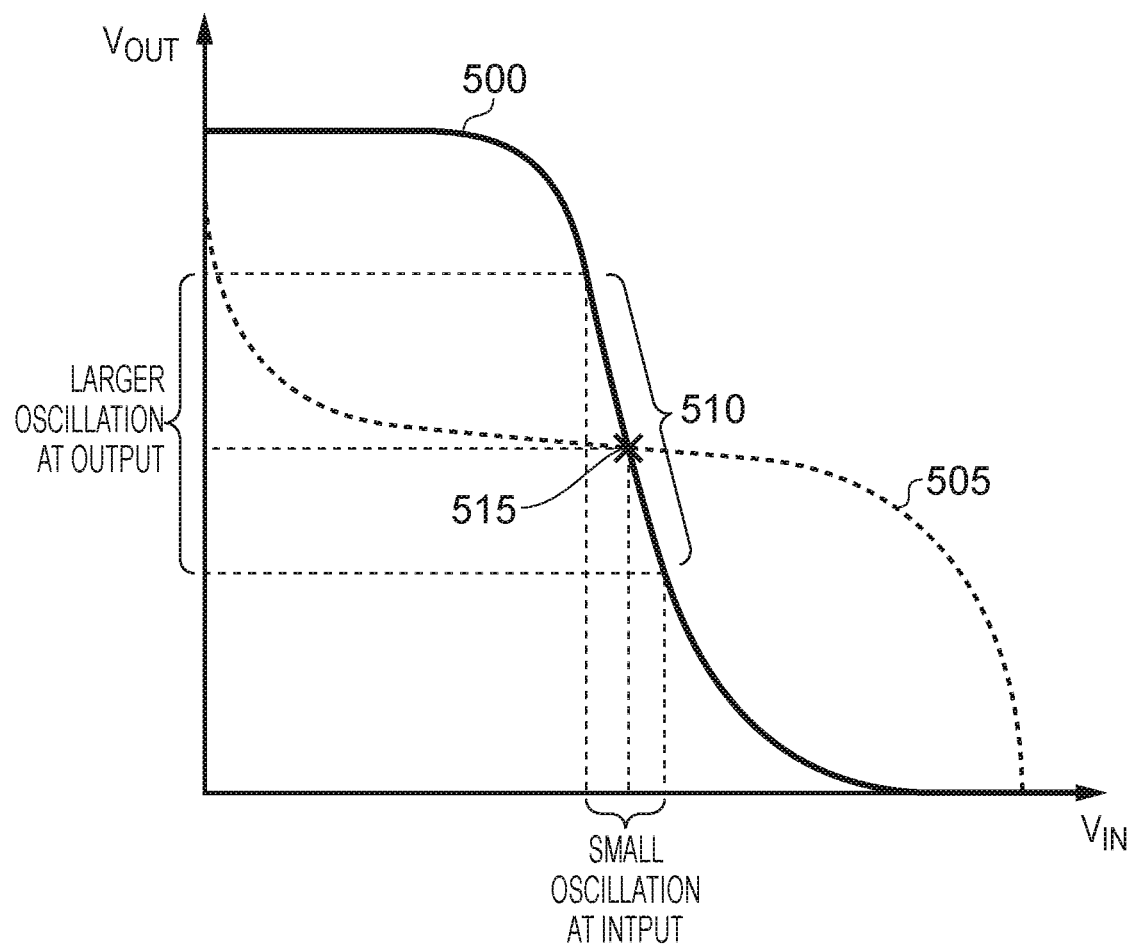

As will be appreciated from FIG. 8A, this enables the analogue to digital conversion within the apparatus to be performed by a very simple digital circuit, allowing a very cost effect and low power consumption solution. The circuitry of FIG. 8A can itself introduce some noise into the received signal, for example due to variation in the comparator threshold, which can manifest itself as occasional spurious additional or omitted edges in the digital representation that is output to the counter. However, by using the non-linear mapping within the quantizer discussed earlier, such effects can readily be compensated for when creating the soft decisions to forward to the correlator 30.

Figure 9A:
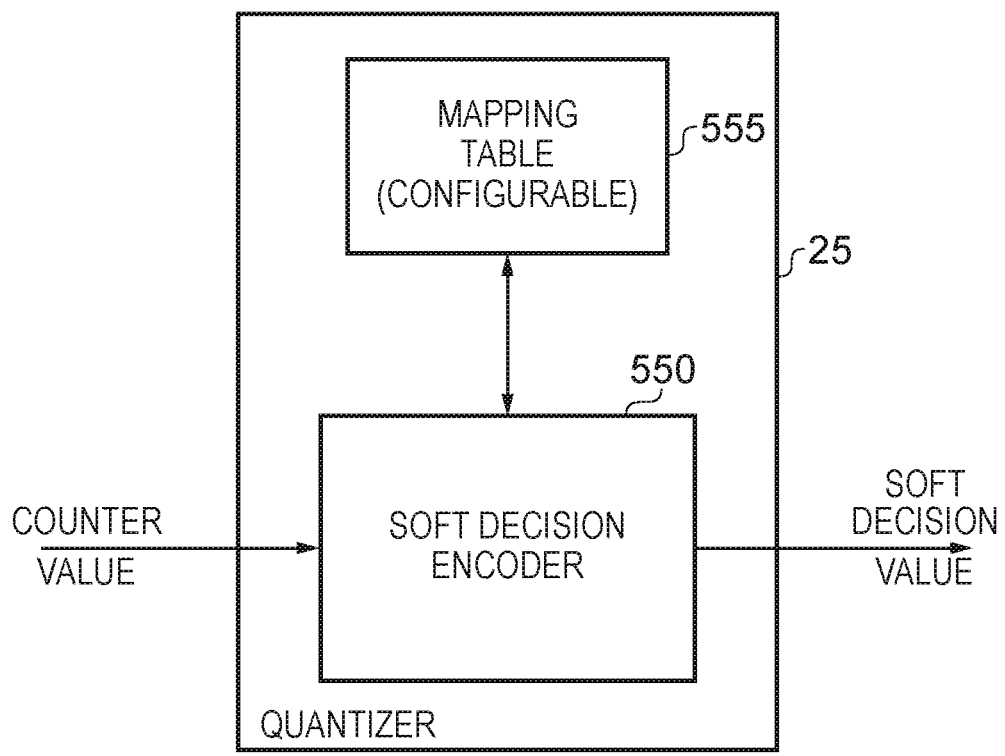
FIGS. 9A and 9B are diagrams illustrating the operation of the quantizer of FIG. 1 in accordance with certain embodiments.

FIG. 9A illustrates the operation of the quantizer 25 in one embodiment. In this example, a mapping table 555 is provided which is optionally reconfigurable, and provides a mapping between possible counter values and the associated soft decision value. The mapping table hence encodes the non-linear mapping discussed earlier with reference to FIGS. 5, 6A and 6B. A soft decision encoder 550 is then provided, which receives each counter value and references the mapping table in order determine the appropriate soft decision value to output.

Figure 9B:
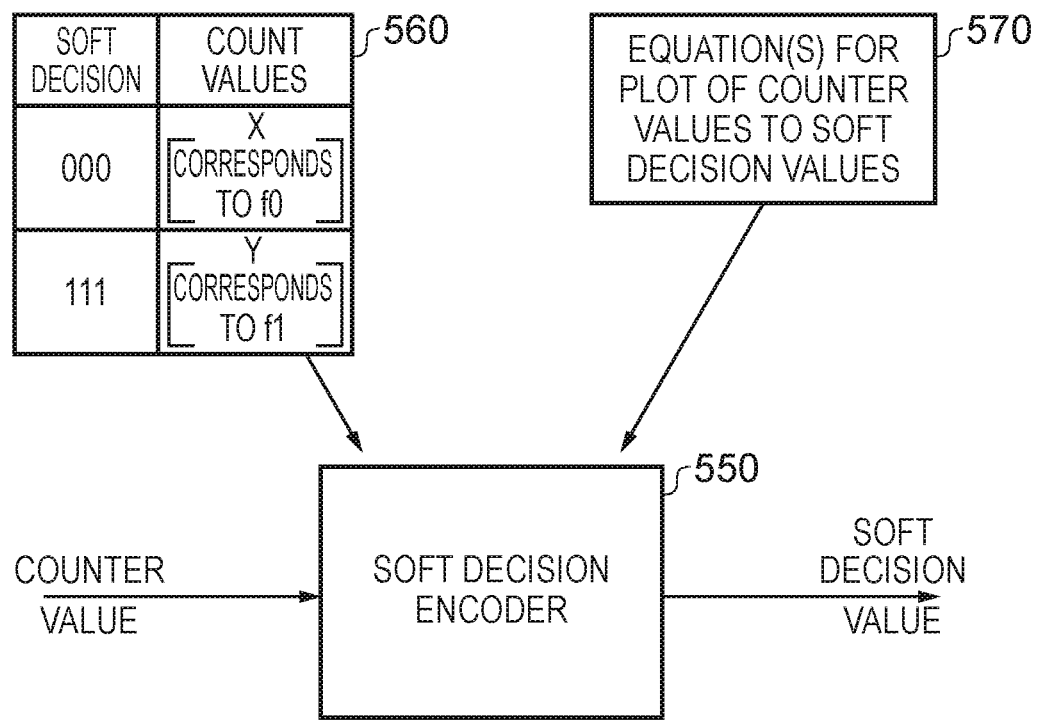

Whilst it is possible that the mapping table could provide a direct mapping for every possible counter value, this could lead to a relatively large mapping table. FIG. 9B illustrates an alternative embodiment where only certain key counter values are encoded within the mapping table 560. In particular, considering the specific example of FIG. 5, the count values corresponding to the points 265 and 270 may be identified in the mapping table, and be mapped to the corresponding soft decision values "000" and "111", respectively. Storage 570 then may provide one or more equations to identify how every other possible count value should be mapped to a soft decision value based on the two specific count values identified in the table 560. Considering the particular example of FIG. 5, it will be appreciated that all that is required is to encode the equations for the three straight lines, namely the straight line from points 250 to 265, the straight line from points 265 to 270, and the straight line from points 270 to 255. The soft decision encoder 550 can then reference both the table 560 and the equations 570 in order to calculate for any particular received count value, the appropriate soft decision value to output to the correlator 30.

Figure 10:
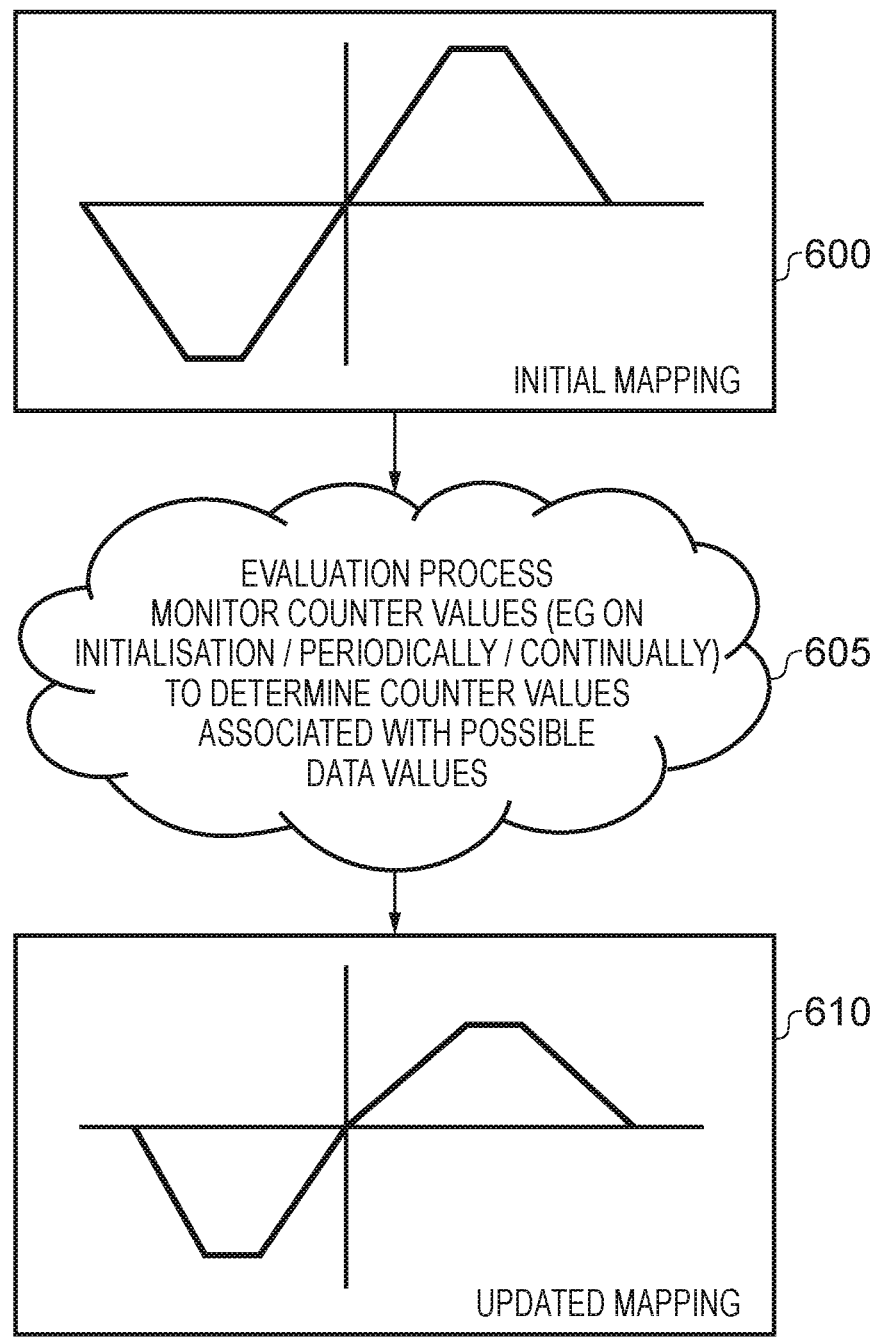
FIG. 10 illustrates how the quantizer may be reconfigured in accordance with one embodiment.

FIG. 10 schematically illustrates how the non-linear mapping may be reconfigured during operation. An initial mapping 600 is shown which is referenced by the quantizer during operation. An evaluation process 605 can be used to monitor the count values produced by the counter 20 at certain stages, dependent on how the reconfiguration circuitry 40 is employed. For example, the evaluation process may be performed on initialisation, may be performed periodically using test transmission sequences, or indeed the evaluation process may operate continually in the background, based on the evaluation of the count values produced during normal operation of the apparatus 10. The evaluation process can seek to identify the most commonly occurring count values, and match those with the strongest likelihood of representing a particular data value. Over time, this may cause the profile of the non-linear mapping to be changed, as illustrated schematically by the updated mapping 610 shown in FIG. 10. By such an approach, it is possible to take a count of time varying effects of noise on the transmitted signals, allowing the apparatus to continue to compensate for noise effects that vary over time, hence improving the accuracy of the receiver.

In the above described embodiments, it will be seen that such embodiments provide an improved sensitivity correlation receiver using soft decisions, that can be implemented using all digital components, and in one embodiment can be constructed using standard cells from a standard cell library. This provides a low cost, and low power consumption solution for producing a receiver with improved sensitivity, due to its ability to operate using soft decisions, but without the power consumption requirements of known soft decision receivers.

In the embodiment described with reference to FIG. 1, the incoming signal is converted into a digital waveform using a high gain comparator, and then simple digital processing techniques are used to convert the digital waveform into N-bit soft decisions that can be passed to the correlator. A non-linear frequency counting approach is used to convert the thresholded digital waveform into soft decisions for each data block transmission period. The quantizer can then determine which of the possible symbol states the counter value is closest to, represented using the N-bit soft decision.

Since the counter circuitry accumulates a count value for a single symbol period, its output gives the average frequency of the current symbol. Whilst noise may cause undesired transitions in the digital waveform and subsequent count value for the symbol, the quantizer combats this by assigning the strongest likelihood to expected symbol frequencies (count values), and allocating soft decisions representing weaker likelihood to average frequency counts that diverge above or below those expected values. The correlator can then exploit the N-bit soft decisions by assigning less significance to decisions that are corrupted with noise, leading to much higher sensitivity.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A receiver apparatus, comprising:
an amplifying comparator circuit to receive, as an analog signal, an input signal comprising a sequence of data blocks and to convert said analog signal into a digital representation of the input signal;
counter circuitry to receive the digital representation of the input signal, and for each data block to generate a count value indicative of occurrences of a predetermined edge transition within the digital representation during an associated data block transmission period;
quantization circuitry to map each count value to a soft decision value from amongst a predetermined set of soft decision values, the number of soft decision values in said predetermined set exceeding a number of possible data values of the data block;
wherein over a range of possible count values the quantization circuitry is arranged to apply a non-linear mapping between count values in that range and corresponding soft decision values;

output circuitry to generate a digital output signal in dependence on the soft decision values; and reconfiguration circuitry to monitor the digital representation over multiple data blocks to determine from the resulting count values the likelihood of individual count values indicating particular data values of the data block, and to update the non-linear mapping dependent on said determination.

2. The receiver apparatus as claimed in claim 1, wherein the non-linear mapping is arranged to take into account an effect of noise on the predetermined edge transition within the digital representation whose occurrence is to be counted by the counter circuitry.

3. The receiver apparatus as claimed in claim 1, wherein said reconfiguration circuitry is arranged to operate in one or more of:

an initialisation mode where the updating of the mapping occurs on initialisation of the apparatus using at least one predetermined transmitted signal to form the input signal;

a periodic testing mode where a periodic testing process is performed using at least one predetermined transmitted signal to form the input signal; and a continuous monitoring mode where the updating of the mapping occurs based on the count values obtained from the digital representation of the input signal provided during active operation of the apparatus.

4. The receiver apparatus as claimed in claim 1, wherein the output circuitry comprises correlator circuitry to determine a correlation between at least one predetermined data pattern and a sequence of the soft decision values received from the quantization circuitry, and to generate the digital output signal dependent on said determination.

5. The receiver apparatus as claimed in claim 1, wherein said amplifying comparator circuit comprises a series of inverter stages, at least one of the inverter stages incorporating a feedback path.

6. The receiver apparatus as claimed in claim 1, wherein the input signal is in a modulated format, such that the number of occurrences of said predetermined edge transition within the digital representation within the data block transmission period vary in dependence on a data value of the data block and at least one noise factor.

7. The receiver apparatus as claimed in claim 1, wherein each data block comprises a single bit data value.

8. The receiver apparatus as claimed in claim 1, wherein the input signal is received by the apparatus from a transmitter, the apparatus further comprising synchronisation circuitry to synchronise a start of each data block transmission period with a portion of the digital representation corresponding to a data block in the received input signal.

9. The receiver apparatus as claimed in claim 1, wherein for at least some data blocks an expected repetition rate of the predetermined edge transition within the digital representation is higher than a frequency of repetition of the data block transmission period.

10. A method of operating a receiver apparatus to process a received analog input signal comprising a sequence of data blocks, comprising:

employing an amplifying comparator circuit to convert said analog input signal into a digital representation;

for each data block, employing counter circuitry to generate a count value indicative of occurrences of a predetermined edge transition within the digital representation during an associated data block transmission period;

mapping each count value to a soft decision value from amongst a predetermined set of soft decision values, the number of soft decision values in said predetermined set exceeding a number of possible data values of the data block;

over a range of possible count values, applying a non-linear mapping between count values in that range and corresponding soft decision values;

generating a digital output signal in dependence on the soft decision values; and monitoring the digital representation over multiple data blocks to determine from the resulting count values the likelihood of individual count values indicating particular data values of the data block, and updating the non-linear mapping dependent on said determination.

11. A receiver apparatus, comprising:

means for receiving, as an analog signal, an input signal comprising a sequence of data blocks and for converting said analog signal into a digital representation of the input signal;

means for receiving the digital representation of the input signal, and for generating, for each data block, a count value indicative of occurrences of a predetermined edge transition within the digital representation during an associated data block transmission period;

means for mapping each count value to a soft decision value from amongst a predetermined set of soft decision values, the number of soft decision values in said predetermined set exceeding a number of possible data values of the data block;

wherein over a range of possible count values the means for mapping is arranged to apply a non-linear mapping between count values in that range and corresponding soft decision values;

means for generating a digital output signal in dependence on the soft decision values; and means for monitoring the digital representation over multiple data blocks to determine from the resulting count values the likelihood of individual count values indicating particular data values of the data block, and for updating the non-linear mapping dependent on said determination.

* * * * *